United States Patent Office 3,202,572
Patented Aug. 24, 1965

3,202,572
AGENT FOR COMBATING NEMATODES
Horst Werres and Heinz-Eberhard Freund, Berlin-Charlottenburg, and Ernst-Albrecht Pieroh, Berlin-Hermsdorf, Germany, assignors to Schering AG, Berlin, Germany
No Drawing. Filed Dec. 13, 1960, Ser. No. 75,467
Claims priority, application Germany, Dec. 15, 1959, Sch 27,135
15 Claims. (Cl. 167—30)

The present invention relates to an agent for combating nematodes, and more particularly to a new series of compounds which have been found to be highly effective in combating nematodes while having the important advantage of compatibility with plants.

Various chemical compounds have been provided for combating nematodes, however, among all of the compounds known only very few have been found to be effective against nematodes while at the same time being compatible to the plants. It is of course apparent that an agent which will damage plants to which it is applied cannot be used effectively for combating nematodes.

Among the compounds which have been tried for combating nematodes are those described in German Patent No. 742,185 which are of the following general formula:

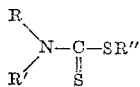

wherein R, R' and R" are alkyl, aryl or aralkyl and wherein R or R' can be hydrogen. The German patent names only N-disubstituted compounds of which the compound dimethyldithiocarbamic acid-methyl ester is the one which is named in the examples for practical use. However, even this N-dimethyldithiocarbamic acid ester requires relatively high dosages for the purpose of combating nematodes, and in the high dosages necessary for this purpose, the compound causes unfavorable phytotoxic damage to the plants.

It is accordingly a primary object of the present invention to provide a new series of compounds which are highly effective against nematodes and which can be used in doses which do not have any damaging effect on the plants.

It is a further object of the present invention to provide compositions for combating nematodes and a method for combating nematodes by applying the new compounds of the present invention to plants.

It is yet a further object of the present invention to provide a new series compounds which are highly compatible with plants and do not damage the same, and which compounds are highly effective in small doses against nematodes.

The present invention will also describe the methods of producing the compounds of the present invention.

Other objects and advantages of the present invention will be apparent from a further reading of the specification and of the appended claims.

With the above and other objects in view, the present invention mainly comprises a compound of the formula:

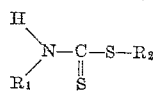

wherein $R_1$ is selected from the group consisting of halogen-substituted aryl and halogen-substituted aralkyl radicals wherein the alkyl is a lower alkyl, and wherein $R_2$ is selected from the group consisting of alkyl, lower alkenyl, aryl, aralkyl wherein the alkyl is a lower alkyl, and nitro-, halogen- and amino-substituted alkyl, lower alkenyl, aryl and aralkyl radicals.

The substituent $R_1$ is preferably a halogen-substituted phenyl radical, wherein the halogen is preferably chlorine or bromine, and most preferably chlorine, and $R_1$ is most preferably the para-chlorophenyl radical. However, as indicated above, $R_1$ may also be a halogen-substituted (preferably chlorine or bromine) aralkyl radical wherein the alkyl is a lower alkyl.

The substituent $R_2$ is preferably an alkyl of up to 14 carbon atoms. It may also be a lower alkenyl, most preferably allyl or an aralkyl wherein the alkyl is a lower alkyl, e.g. benzyl.

It is quite surprising that the compounds of the present invention even at low concentration are particularly active against nematodes while being compatible with plants. This is most surprising in view of the fact that the compounds of German Patent No. 742,185 falling within the general formula given above include many compounds which have practically no activity whatsoever against nematodes, and further in view of the fact that it is well known to be impossible to make general predictions with respect to the biological activity of compounds.

Table I which follows sets forth results obtained in testing the activity of various compounds of the present invention:

TABLE I

| Compound | Mg. active ingredient 1. earth | Nematicidal action, percent |
|---|---|---|
| 1. N-(p-chlorophenyl)-dithiocarbamic acid methyl ester. | 60<br>80<br>100<br>120 | 97.0<br>99.8<br>100.0<br>100.0 |
| 2. N-(p-chlorophenyl)-dithiocarbamic acid-ethyl ester. | 60<br>80<br>100<br>120 | 97.8<br>100.0<br>100.0<br>100.0 |
| 3. N-(p-chlorophenyl)-dithiocarbamic acid-n-butyl ester. | 60<br>80<br>100<br>120 | 97.9<br>99.6<br>100.0<br>100.0 |
| 4. N-(p-chlorophenyl)-dithiocarbamic acid-allyl ester. | 60<br>80<br>100<br>120 | 96.2<br>99.6<br>100.0<br>100.0 |
| 5. N-(p-chlorophenyl)-dithiocarbamic acid-benzyl ester. | 60<br>80<br>100<br>120 | 24.4<br>77.4<br>91.9<br>97.1 |
| 6. N-(p-chlorophenyl)-dithiocarbamic acid-propyl ester. | 100<br>50 | 100<br>89.3 |
| 7. N-(p-chlorophenyl)-dithiocarbamic acid-pentyl ester. | 100<br>50 | 100<br>55.3 |
| 8. N-(p-chlorophenyl)-dithiocarbamic acid-hexyl ester. | 100<br>50 | 99.4<br>71.2 |
| 9. N-(p-chlorophenyl)-dithiocarbamic acid-nonyl ester. | 100 | 58.4 |
| 10. N-(p-chlorophenyl)-dithiocarbamic acid-dodecyl ester. | 100 | 57.7 |

In comparison thereto the known compound N-dimethyldithiocarbamic acid-methyl ester was tested for activity under the same conditions and found to have a much lower activity. The results thereof are set forth in Table II below:

TABLE II

| Compound | Mg. active ingredient l. earth | Nematicidal action, percent |
|---|---|---|
| N-dimethyldithio-carbamic acid-methyl ester | 60 | 0 |
| | 80 | 0 |
| | 100 | 0 |
| | 120 | 36 |

The compounds tested were used in the form of 20% preparations. The activity was tested against root knot nematodes, meloidogyne spp. The tested earth was homogeneously mixed with the preparation. The concentration given is per liter of earth. The moisture content of the earth was 20%. The temperature during the 12 day waiting period was 8° C., the plant tested was the tomato plant, and the duration of the culturing was 31 days at 25–28° C.

The compounds of the present invention may be used in practice in the form of usual preparations, for example in the form of powder for dusting using a solid inert carrier of the normal type, e.g. silicates, aluminum silicates such as silicaceous clay, bentonite, fuller's earth, etc. The compounds of the present invention may also be used in the form of emulsion or as solutions in organic solvents, such as acetone, methanol, chlorinated hydrocarbons and the like. In addition the compositions may contain the normal additives such as wetting agents, emulsifiers and the like.

The following example illustrates the production of the compounds of the present invention. The scope of the invention is not, however, meant to be limited to the specific details of the example:

*Example 1.—The production of N-(p-chlorophenyl)-dithiocarbamic acid-methyl ester*

6.25 cc. (0.1 mol) of methyl iodide are added dropwise to a suspension of 22.0 g. (0.1 mol) of N-(p-chlorophenyl)-dithiocarbamic acid-ammonium in 50 cc. of methanol, while stirring. This results in an increase of the temperature to about 45° C. The reaction mixture is stirred for an additional hour after approximately 45° C. Thereafter the reaction solution is cooled to room temperature and poured into approximately 200 cc. of water. The resulting precipitate is filtered off under suction, washed with water, dried and recrystallized from light gasoline. The yield is 18.5 g. which is equivalent to 85% of the theoretical. The melting point is 107–108° C.

In analogous manner other compounds of the present invention may be formed and Table III below sets forth the melting points of various different compounds of the present invention:

TABLE III

| Compound: | Melting point, ° C. |
|---|---|
| N-(p-chlorophenyl)-dithiocarbamic acid-ethyl ester | 90–91 |
| N-(p-chlorophenyl)-dithiocarbamic acid-n-butyl ester | 88–89 |
| N-(p-chlorophenyl)-dithiocarbamic acid-benzyl ester | 101–102 |
| N-(p-chlorophenyl)-dithiocarbamic acid-p-chlorobenzyl-ester | 104–105 |
| N-(p-chlorophenyl)-dithiocarbamic acid-allyl ester | 89–90 |
| N-(p-chlorophenyl)-dithiocarbamic acid-hexyl ester | 45–46 |
| N-(p-chlorophenyl)-dithiocarbamic acid-propyl ester | 42.5–43.5 |

TABLE III—Continued

| Compound—Continued | Melting point, ° C. |
|---|---|
| N-(p-chlorophenyl)-dithiocarbamic acid-pentyl ester | 49–50 |
| N-(p-chlorophenyl)-dithiocarbamic acid-heptyl ester | 53.5–54 |
| N-(p-chlorophenyl)-dithiocarbamic acid-nonyl ester | 62.5–63.5 |
| N-(p-chlorophenyl)-dithiocarbamic acid-decyl ester | 56–57 |
| N-(p-chlorophenyl)-dithiocarbamic acid-dodecyl ester | 46–47 |

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method for combating nematodes attack of plants, which comprises applying to the earth in the area in which the plant grows a compound of the formula:

wherein $R_1$ is selected from the group consisting of halogen-substituted phenyl and halogen-substituted alkylphenyl wherein the alkyl is a lower alkyl, and wherein $R_2$ is selected from the group consisting of alkyl, lower alkenyl, phenyl, alkylphenyl wherein the alkyl is a lower alkyl, and nitro-, halogen- and amino-substituted alkyl, lower alkenyl, phenyl and alkylphenyl in an amount of at least 50 mg. per liter of earth.

2. A method according to claim 1, wherein said compound is N-(p-chlorophenyl)-dithiocarbamic acid-alkyl ester.

3. A method according to claim 1 wherein said compound is N-(p-chlorophenyl)-dithiocarbamic acid-methyl ester.

4. A method according to claim 1, wherein said compound is N-(p-chlorophenyl)-dithiocarbamic acid-ethyl ester.

5. A method according to claim 1, wherein said compound is N-(p-chlorophenyl)-dithiocarbamic acid-n-butyl ester.

6. A method according to claim 1, wherein said compound is N-(p-chlorophenyl)-dithiocarbamic acid-allyl ester.

7. A method according to claim 1, wherein said compound is N-(p-chlorophenyl)-dithiocarbamic acid-benzyl ester.

8. A method according to claim 1, wherein said compound is N-(p-chlorophenyl)-dithiocarbamic acid-p-chlorobenzyl ester.

9. A method according to claim 1, wherein said compound is N-(p-chlorophenyl)-dithiocarbamic acid-propyl ester.

10. A method according to claim 1, wherein said compound is N-(p-chlorophenyl)-dithiocarbamic acid-pentyl ester.

11. A method according to claim 1, wherein said compound is N-(p-chlorophenyl)-dithiocarbamic acid-hexyl ester.

12. A method according to claim 1, wherein said compound is N-(p-chlorophenyl)-dithiocarbamic acid-nonyl ester.

13. A method according to claim 1, wherein said compound is N-(p-chlorophenyl)-dithiocarbamic acid-decyl ester.

14. A method according to claim 1, wherein said compound is N-(p-chlorophenyl)-dithiocarbamic acid-dodecyl ester.

15. A method according to claim 1, wherein said compound is N-(p-chlorophenyl)-dithiocarbamic acid-heptyl ester.

References Cited by the Examiner

UNITED STATES PATENTS

| 2,863,899 | 12/58 | Harris | 260—455 |
| 2,916,370 | 12/59 | Tiles | 71—2.7 |
| 2,923,727 | 2/60 | Neumoyer | 260—455 |
| 2,943,972 | 7/60 | Van der Kerk | 167—13 |
| 2,945,877 | 7/60 | Zima | 167—30 |
| 2,990,322 | 6/61 | Jones | 167—30 |
| 3,961,624 | 10/62 | Ludvik et al. | 167—30 |

FOREIGN PATENTS

| 228,387 | 11/43 | Switzerland. |
| 233,721 | 11/44 | Switzerland. |

JULIAN S. LEVITT, *Primary Examiner.*

WILLIAM B. KNIGHT, LEWIS GOTTS, *Examiners.*